(12) United States Patent
Qiu et al.

(10) Patent No.: US 10,659,667 B1
(45) Date of Patent: May 19, 2020

(54) ELECTRONIC DEVICE HAVING RETRACTABLE CAMERA

(71) Applicants:Fu Tai Hua Industry (Shenzhen) Co., Ltd., Shenzhen (CN); HON HAI PRECISION INDUSTRY CO., LTD., New Taipei (TW)

(72) Inventors: Xiao-Yi Qiu, Shenzhen (CN); He Zhou, Shenzhen (CN); Yong Zhao, Shenzhen (CN); Min-Yue Wang, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 16/407,497

(22) Filed: May 9, 2019

(30) Foreign Application Priority Data

Feb. 21, 2019 (CN) .................... 2019 2 0228301 U (51) Int. Cl.
| | |
|---|---|
| *H04M 1/00* | (2006.01) |
| *H04N 5/225* | (2006.01) |
| *G03B 29/00* | (2006.01) |
| *G06F 1/16* | (2006.01) |
| *H04M 1/02* | (2006.01) |

(52) U.S. Cl.
CPC .......... *H04N 5/2254* (2013.01); *G03B 29/00* (2013.01); *G06F 1/1637* (2013.01); *G06F 1/1675* (2013.01); *G06F 1/1686* (2013.01); *H04M 1/0264* (2013.01); *H04M 1/0266* (2013.01); *H04N 5/2257* (2013.01); *G06F 1/1626* (2013.01)

(58) Field of Classification Search
CPC .... H04N 5/2254; H04N 5/2257; G03B 29/00; G06F 1/1637; G06F 1/1686; G06F 1/1626; H04M 1/0264; H04M 1/0266
USPC ........... 455/556.1, 90.3, 575.3, 575.1, 575.4, 455/556.2
See application file for complete search history.

(56) References Cited

U.S. PATENT DOCUMENTS

| | | | | |
|---|---|---|---|---|
| 7,187,957 | B2 * | 3/2007 | Kato | H04M 1/021 348/333.06 |
| 8,342,325 | B2 * | 1/2013 | Rayner | G06F 1/1626 206/320 |
| 8,915,361 | B2 * | 12/2014 | Rayner | G06F 1/1601 206/320 |
| 9,465,544 | B2 * | 10/2016 | Kwon | G06F 3/0679 |
| 9,661,200 | B2 * | 5/2017 | O'Neill | H04N 5/2254 |
| 9,966,985 | B2 * | 5/2018 | DiLaura | H04W 4/80 |
| 10,142,525 | B2 * | 11/2018 | Tachikawa | H04N 5/2252 |

(Continued)

*Primary Examiner* — Marceau Milord
(74) *Attorney, Agent, or Firm* — ScienBiziP, P.C.

(57) ABSTRACT

An electronic device includes a main body, a camera mechanism, a latching mechanism, and a buffer mechanism. The camera mechanism is slidable to extend out of the main body. The main body includes an ejecting member mounted within the main body. The ejecting member is configured to eject the camera mechanism out of the main body. The latching mechanism is mounted within the main body. The latching mechanism is configured to limit movement of the camera mechanism. The buffer mechanism is coupled to the camera mechanism. The buffer mechanism is configured to buffer movement of the camera mechanism.

15 Claims, 5 Drawing Sheets

(56) References Cited

U.S. PATENT DOCUMENTS

| | | | |
|---|---|---|---|
| 2006/0082518 A1* | 4/2006 | Ram | G06F 1/1601 |
| | | | 345/1.1 |
| 2012/0231859 A1* | 9/2012 | Makino | H04M 1/0216 |
| | | | 455/575.4 |
| 2017/0354380 A1* | 12/2017 | Wagstaff | A61B 5/14532 |
| 2018/0227401 A1* | 8/2018 | DiLaura | A45C 15/00 |
| 2018/0245880 A1* | 8/2018 | Campbell | F41G 1/473 |
| 2019/0326943 A1* | 10/2019 | Nguyen | H02J 7/0021 |

* cited by examiner

ELECTRONIC DEVICE HAVING RETRACTABLE CAMERA

FIELD

The subject matter herein generally relates to electronic devices, and more particularly to an electronic device having a retractable camera.

BACKGROUND

Generally, smart devices, such as mobile phones, tablet computers, and the like include a camera mounted in a fixed position on a front surface of the smart device. The camera takes up space on the front surface which limits a full-screen capacity of a display screen mounted on the front surface.

BRIEF DESCRIPTION OF THE DRAWINGS

Implementations of the present disclosure will now be described, by way of embodiments, with reference to the attached figures.

DETAILED DESCRIPTION

It will be appreciated that for simplicity and clarity of illustration, where appropriate, reference numerals have been repeated among the different figures to indicate corresponding or analogous elements. Additionally, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape, or other word that "substantially" modifies, such that the component need not be exact. For example, "substantially cylindrical" means that the object resembles a cylinder, but can have one or more deviations from a true cylinder. The term "comprising" means "including, but not necessarily limited to"; it specifically indicates open-ended inclusion or membership in a so-described combination, group, series and the like.

Figure 1:
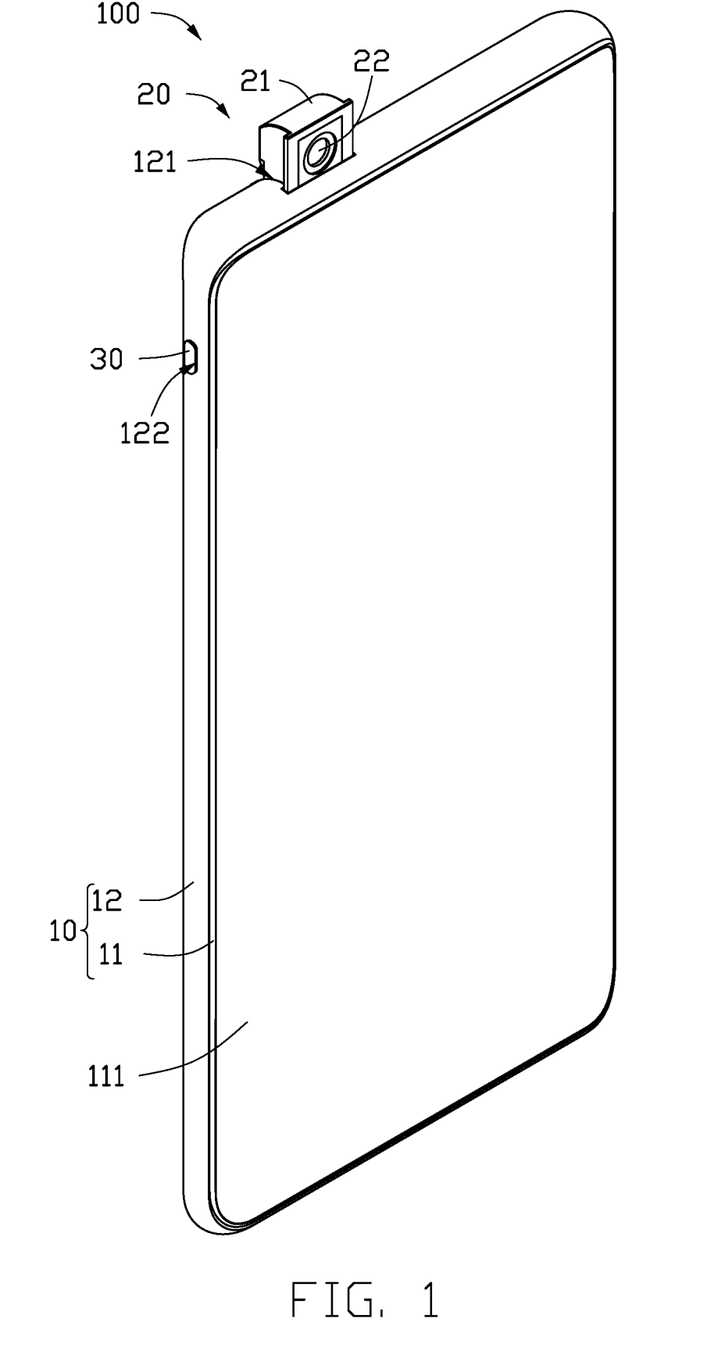
FIG. 1 is an assembled, isometric view of an embodiment of an electronic device.
Figure 2:
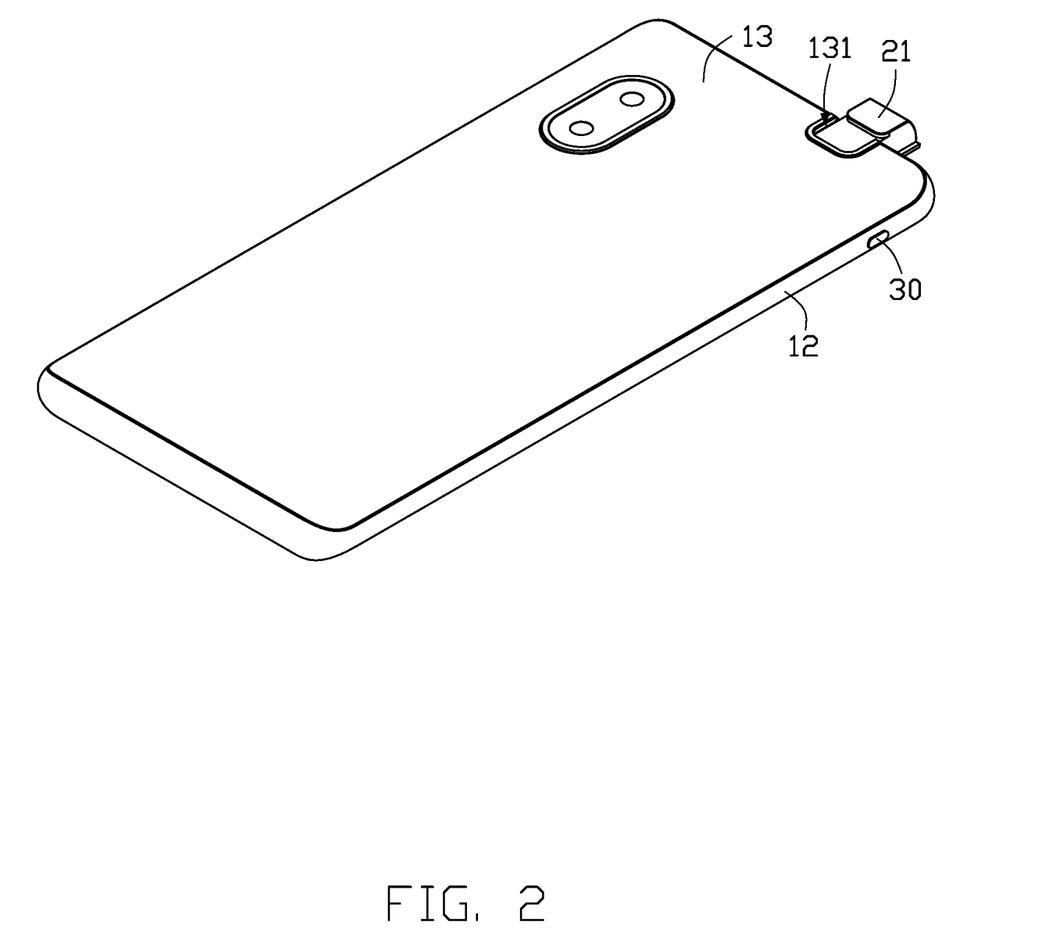
FIG. 2 is similar to FIG. 1, but showing the electronic device from another angle.
Figure 3:
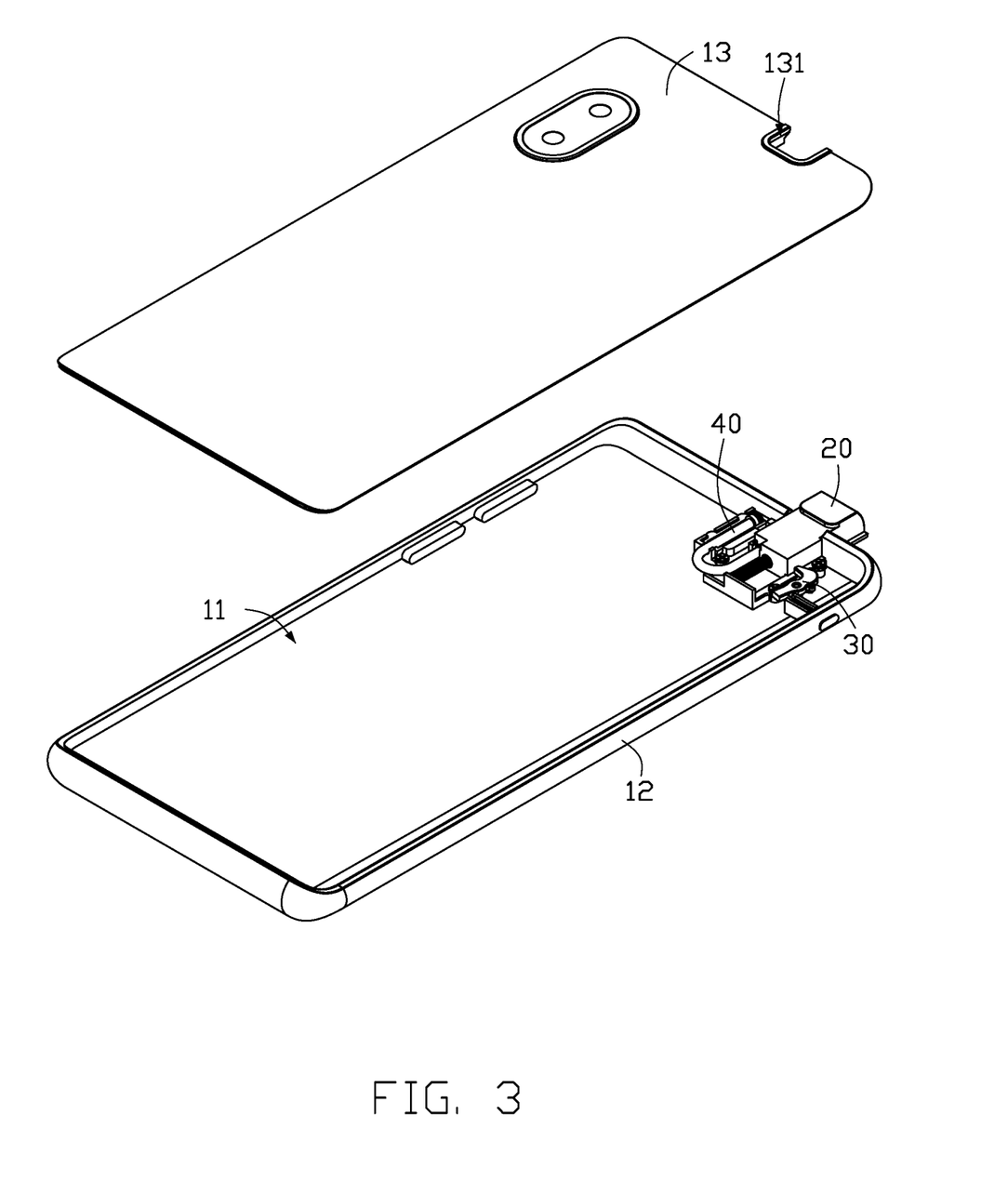
FIG. 3 is a partial enlarged, exploded view of the electronic device in FIG. 2.

FIGS. 1-3 show an embodiment of an electronic device 100. The electronic device 100 includes a main body 10, a camera mechanism 20, a latching mechanism 30, and a buffer mechanism 40. The camera mechanism 20 is movably mounted in the main body 10. The latching mechanism 30 is mounted in the main body 10 and configured to limit movement of the camera mechanism 20. The buffer mechanism 40 is mounted in the main body 10 and coupled to the camera mechanism 20 to buffer movement of the camera mechanism 20. The electronic device 100 may be a mobile phone, a tablet computer, or other smart device having a camera function. In the illustrated embodiment, the electronic device 100 is a mobile phone.

The main body 10 includes a front panel 11, a frame 12, and a rear panel 13. The front panel 11 forms a front surface of the electronic device 100, and the rear panel 13 forms a rear surface of the electronic device 100. The front panel 11 and the rear panel 13 are arranged on opposite sides of the frame 12. A display screen 111 is mounted on a side of the front panel 11 facing away from the rear panel 13. In one embodiment, the display screen 111 has a surface area substantially the same as a surface area of the front panel 11. A receiving hole 121 is defined in the frame 12. In one embodiment, the receiving hole 121 is defined in a top edge of the frame 12. A clearance slot 131 is defined in the rear panel 13 communicating with the receiving hole 121.

In use, the camera mechanism 20 is configured to slide along the clearance slot 131 to protrude from the receiving hole 121 and to be visible from a front side of the front panel 11 on which the display screen 111 is mounted. The camera mechanism 20 can be used to implement specific functions of a front camera for taking a self-portrait.

In other embodiments, the clearance slot 131 can be omitted, as long as the camera mechanism 20 is able to protrude from the receiving hole 121.

Figure 4:
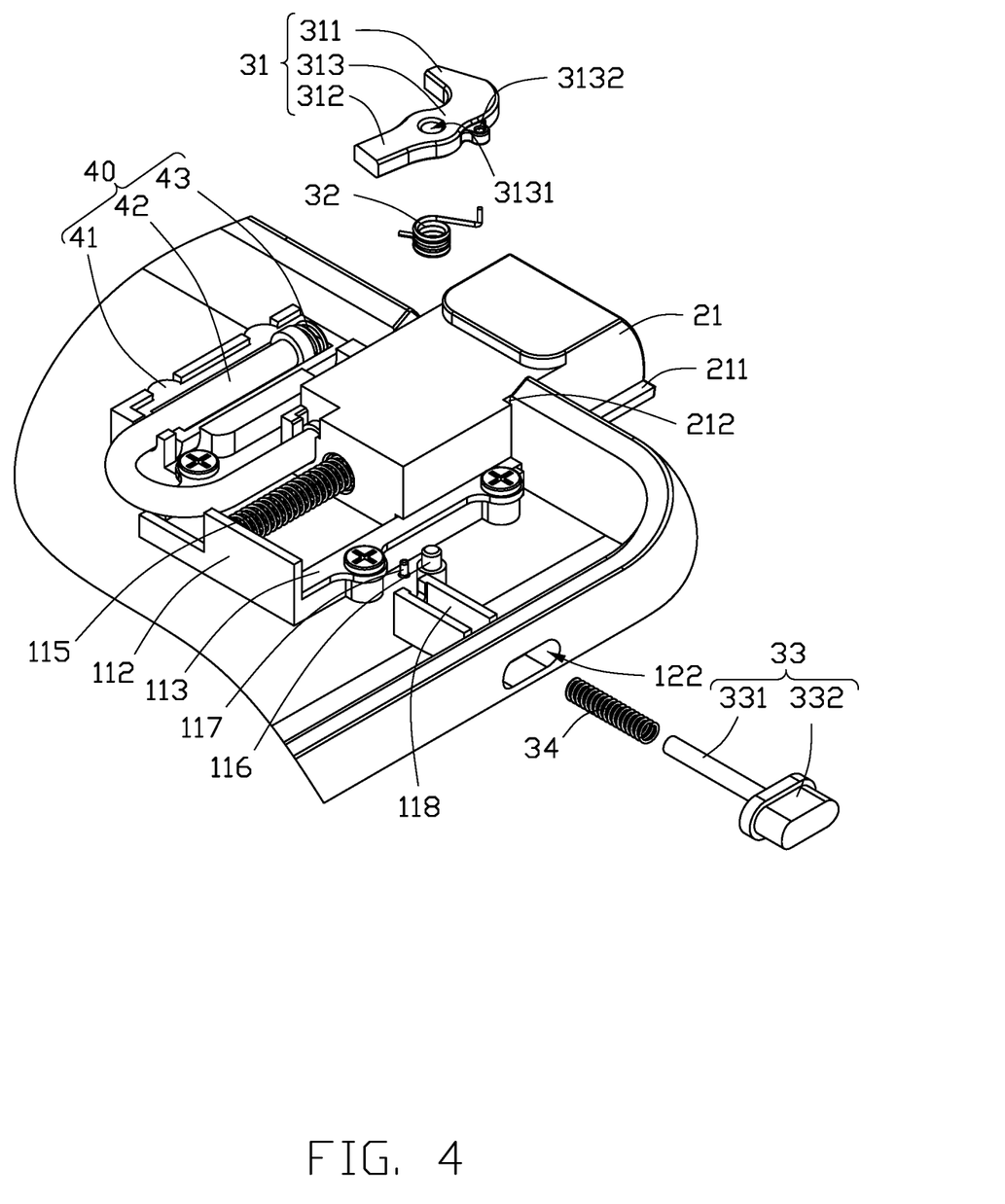
FIG. 4 is an enlarged view of a camera assembly of the electronic device of FIG. 3.
Figure 5:
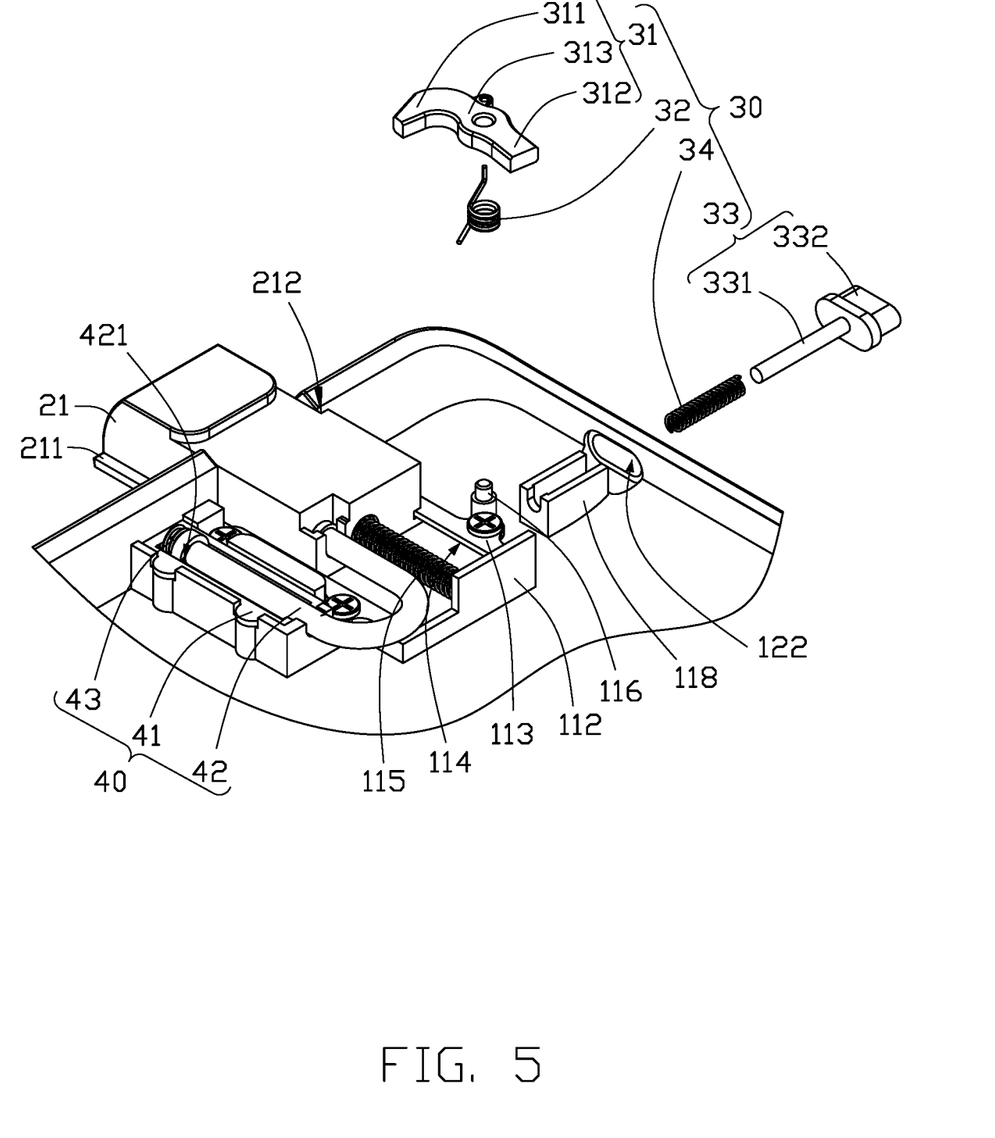
FIG. 5 is similar to FIG. 4, but shown from another angle.

The camera mechanism 20 includes a sliding base 21 and a lens module 22 mounted in the sliding base 21. Referring to FIGS. 4 and 5, a limiting plate 112 and a border strip 113 are mounted on an inner surface of the front panel 11 facing the rear panel 13. The border strip 113 defines a sliding slot 114 extending from the limiting plate 112 to the receiving hole 121. A sliding rail 211 is mounted on the sliding base 21. The sliding rail 211 is configured to slide the sliding base 21 into and out of the receiving hole 121 along the sliding slot 114. An ejecting member 115 is mounted between the limiting plate 112 and the sliding base 21. The ejecting member 115 is configured to eject the sliding base 21 out of the receiving hole 121. In one embodiment, the ejecting member 115 is a spring.

As shown in FIGS. 4 and 5, the latching mechanism 30 includes a latching member 31, a repositioning member 32, a pressing member 33, and a restoring member 34. A latching flange 212 is formed on a side of the sliding base 21. A rotary shaft 116 is mounted on the surface of the front panel 11 facing the rear panel 13. The latching member 31 is rotatable about the rotary shaft 116 and is configured to latch with the latching flange 212 to prevent the sliding base 21 from ejecting out of the receiving hole 121. The repositioning member 32 is configured to bias the latching member 31 to latch with the latching flange 212. The pressing member 33 is configured to be pressed to drive the latching member 31 to rotate about the rotary shaft 116 to unlatch with the latching flange 212. The restoring member 34 is configured to restore the pressing member 33 to an initial position.

A resisting post 117 is mounted on the inner surface of the front panel 11. The inner surface of the front panel 11 defines a guiding groove 118. A button hole 122 is defined in the frame 12. The latching member 31 includes a latching end 311, a resisting end 312, and a rotating portion 313. The rotating portion 313 is between the latching end 311 and the resisting end 312. A rotating hole 3131 and a repositioning hole 3132 are defined in the rotating portion 313. The latching end 311 is configured to latch with the latching flange 212 to prevent the sliding base 21 from ejecting out of the receiving hole 121. The rotating portion 313 is rotationally sleeved over the rotary shaft 116 through the rotating hole 3131. The repositioning member 32 is sleeved over the rotary shaft 116 such that one end of the repositioning member 32 resists against the resisting post 117 and a second end of the repositioning member 32 is received in the repositioning hole 3132.

The pressing member 33 includes a guiding rod 331 and a button 332. The guiding rod 331 is configured to extend through the guiding groove 118. The button 332 is coupled to one end of the guiding rod 331, and a second end of the guiding rod 331 abuts against the resisting end 312. The button 332 is mounted in the button hole 122. The restoring member 34 is sleeved over the guiding rod 331 such that one end of the restoring member 34 resists against an end wall of the guiding groove 118, and a second end of the restoring member 34 resists against an inner surface of the frame 12. In the illustrated embodiment, the repositioning member 32 is a torsion spring, and the restoring member 34 is a compression spring.

In one embodiment, the receiving hole 121 and the button hole 122 are defined on two different sides of the frame 12.

In one embodiment, the buffer mechanism 40 is a hydraulic device and includes a cylinder 41, a piston 42, and a piston spring 43. The cylinder 41 contains oil (not shown). The cylinder 41 is mounted in the main body 10. One end of the piston 42 is movably mounted in the cylinder 41, and a second end of the piston 42 extends from the cylinder 41 to be coupled to the sliding base 21. An oil guiding hole 421 is defined in the end of the cylinder 41 mounted in the cylinder 41. The piston spring 43 is mounted in the cylinder 41. One end of the piston spring 43 resists against the cylinder 41, and a second end of the piston spring 43 resists against the piston 42. The oil fills the remaining space in the cylinder 41.

It will be appreciated that in other embodiments, spring bumpers, polyurethane bumpers, and the like can also be used as the buffer mechanism 40.

When the camera mechanism 20 is needed, the button 332 is first pressed to compress the restoring member 34, and the guiding rod 331 pushes the resisting end 312 to rotate the latching member 31 about the rotary shaft 116. When the latching member 31 rotates about the rotary shaft 116, the latching end 311 is unlatched from the latching flange 212, and the ejecting member 115 decompresses to drive the sliding base 21 to slide along the sliding slot 114 and protrude out of the receiving hole 121, so that the lens module 22 is viewable from the side of the front panel 11 on which the display screen 111 is mounted. The latching member 31 and the pressing member 33 are respectively returned to an initial position by the repositioning member 32 and the restoring member 34. When the camera mechanism 20 is not required to be used, the sliding base 21 is pressed to slide along the sliding groove 114 into the receiving hole 121, thereby compressing the repositioning member 32 to drive the latching end 311 to latch with the latching flange 212 on the sliding base 21 to hold the camera mechanism 20 within the frame 12. Since the sliding base 21 is coupled to the piston 42, when the sliding base 21 slides, the piston 42 is compressed to compress a portion of the oil in the cylinder 41, and the compressed oil reduces compression of the piston 42. The compressed oil flows through the oil guiding hole 421 of the piston 42 to an uncompressed portion of the cylinder 41, thereby cushioning the piston 42. The piston 42 is coupled to the sliding base 21, thereby buffering the sliding base 21 during sliding.

It can be understood that in other embodiments, the latching mechanism 30 can adopt other structures, such as a self-locking button switch or the like on the camera mechanism 20.

The electronic device 100 can extend the camera mechanism 20 by pressing the button 332, and the camera mechanism 20 is retracted within the electronic device 100 by pressing the sliding base 21 into the receiving hole 121. Thus, the display screen 111 on the front panel 11 has a larger display area. By filling the cylinder 41 with oil, the piston 42 prevents the camera mechanism 20 from sliding to quickly, thereby preventing damage to the camera mechanism 20.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. An electronic device comprising:
a main body;
a camera mechanism slidable to extend out of the main body; and
a latching mechanism; wherein:
the main body comprises an ejecting member mounted within the main body;
the ejecting member is configured to eject the camera mechanism out of the main body;
the latching mechanism is mounted within the main body and configured to limit movement of the camera mechanism;
a buffer mechanism mounted within the main body, wherein:
the buffer mechanism is coupled to the camera mechanism and configured to buffer movement of the camera mechanism;
the buffer mechanism comprises a cylinder, a piston, and a piston spring;
the cylinder is configured to contain oil and mounted within the main body;
one end of the piston is movably mounted within the cylinder, and a second end of the piston extends from the cylinder to couple to the camera mechanism;
the end of the piston mounted within the cylinder defines an oil guiding hole;
the piston spring is mounted within the cylinder;
one end of the piston spring resists against the cylinder, and a second end of the piston spring resists against the piston;
a remaining space within the cylinder is filled with the oil.

2. The electronic device of claim 1, wherein:
the main body comprises a front panel, a frame, and a rear panel;
the front panel and the rear panel are respectively coupled to opposite sides of the frame;

a display screen is mounted on an inner surface of the front panel facing away from the rear panel;
the frame defines a receiving hole;
the camera mechanism is configured to extend out of the main body through the receiving hole.

3. The electronic device of claim 2, wherein:
the camera mechanism comprises a sliding base and a lens module mounted on the sliding base;
a border strip is mounted on an inner surface of the front panel facing the rear panel;
the border strip defines a sliding slot extending toward the receiving hole;
the sliding base comprises a sliding rail;
the sliding rail is configured to slide along the sliding slot to slidably receive the sliding base through the receiving hole.

4. The electronic device of claim 3, wherein:
a limiting plate is mounted on the inner surface of the front panel facing the rear panel;
the limiting plate faces the receiving hole and extends toward the rear panel;
the ejecting member is mounted between the limiting plate and the sliding base.

5. The electronic device of claim 4, wherein:
the latching mechanism comprises a latching member, a repositioning member, a pressing member, and a restoring member;
the sliding base comprises a latching flange adjacent to the latching mechanism;
a rotary shaft is mounted on the inner surface of the front panel facing the rear panel;
the latching member is rotationally mounted on the rotary shaft to latch with the latching flange to prevent the sliding base from ejecting out of the main body;
the repositioning member is configured to bias the latching member to latch with the latching flange;
the pressing member is configured to resist against the latching member to rotate the latching member to unlatch from the latching flange;
the restoring member is configured to restore the pressing member to an original position.

6. The electronic device of claim 5, wherein:
a resisting post is mounted on the inner surface of the front panel;
the inner surface of the front panel defines a guiding groove;
the frame defines a button hole;
the latching member comprises a latching end, a resisting end, and a rotating portion;
the rotating portion is between the latching end and the resisting end;
the rotating portion defines a rotating hole and a repositioning hole;
the latching end is configured to latch with the latching flange;
the rotating portion is rotationally sleeved over the rotary shaft;
the repositioning member is sleeved over the rotary shaft, such that one end of the repositioning member resists the resisting post, and a second end of the repositioning member is mounted in the repositioning hole;
the pressing member is configured to resist against the resisting end to rotate the latching member to unlatch the latching end from the latching flange.

7. The electronic device of claim 6, wherein:
the pressing member comprises a guiding rod and a button;
the guiding rod is configured to pass through the guiding groove;
one end of the guiding rod is coupled to the button, and a second end of the guiding rod is configured to resist against the resisting end;
the button is located within the button hole;
the restoring member is sleeved over the guiding rod;
one end of the restoring member resists against an end wall of the guiding groove, and a second end of the restoring member resists against an inner surface of the frame.

8. The electronic device of claim 2, wherein:
the rear panel defines a clearance slot communicating with the receiving hole;
the camera mechanism is configured to slide along the clearance slot to extend out of the main body through the receiving hole.

9. An electronic device comprising:
a main body;
a camera mechanism;
a latching mechanism; and
a buffer mechanism; wherein:
the camera mechanism is slidable to extend out of the main body;
the main body comprises an ejecting member mounted within the main body;
the ejecting member is configured to eject the camera mechanism out of the main body;
the latching mechanism is mounted within the main body;
the latching mechanism is configured to limit movement of the camera mechanism;
the buffer mechanism is coupled to the camera mechanism;
the buffer mechanism is configured to buffer movement of the camera mechanism;
the buffer mechanism comprises a cylinder, a piston, and a piston spring;
the cylinder is configured to contain oil;
the cylinder is mounted within the main body;
one end of the piston is movably mounted within the cylinder, and a second end of the piston extends from the cylinder to couple to the camera mechanism;
the end of the piston mounted within the cylinder defines an oil guiding hole;
the piston spring is mounted within the cylinder;
one end of the piston spring resists against the cylinder, and a second end of the piston spring resists against the piston;
a remaining space within the cylinder is filled with the oil;
the main body comprises a front panel, a frame, and a rear panel;
the front panel and the rear panel are respectively coupled to opposite sides of the frame;
a display screen is mounted on an inner surface of the front panel facing away from the rear panel;
the frame defines a receiving hole;
the camera mechanism is configured to extend out of the main body through the receiving hole.

10. The electronic device of claim 9, wherein:
the camera mechanism comprises a sliding base and a lens module mounted on the sliding base;
a border strip is mounted on an inner surface of the front panel facing the rear panel;
the border strip defines a sliding slot extending toward the receiving hole;
the sliding base comprises a sliding rail;

the sliding base is slidably received through the receiving hole by the sliding rail sliding along the sliding slot.

11. The electronic device of claim 10, wherein:
a limiting plate is mounted on the inner surface of the front panel facing the rear panel;
the ejecting member is mounted between the limiting plate and the sliding base.

12. The electronic device of claim 11, wherein:
the latching mechanism comprises a latching member, a repositioning member, a pressing member, and a restoring member;
the sliding base comprises a latching flange;
a rotary shaft is mounted on the inner surface of the front panel facing the rear panel;
the latching member is rotationally mounted on the rotary shaft to latch with the latching flange to prevent the sliding base from ejecting out of the main body;
the repositioning member is configured to bias the latching member to latch with the latching flange;
the pressing member is configured to resist against the latching member to rotate the latching member to unlatch from the latching flange;
the restoring member is configured to restore the pressing member to an original position.

13. The electronic device of claim 12, wherein:
a resisting post is mounted on the inner surface of the front panel;
the inner surface of the front panel defines a guiding groove;
the frame defines a button hole;
the latching member comprises a latching end, a resisting end, and a rotating portion;
the rotating portion is between the latching end and the resisting end;
the rotating portion defines a rotating hole and a repositioning hole;
the latching end is configured to latch with the latching flange;
the rotating portion is rotationally sleeved over the rotary shaft;
the repositioning member is sleeved over the rotary shaft, such that one end of the repositioning member resists the resisting post, and a second end of the repositioning member is mounted in the repositioning hole;
the pressing member is configured to resist against the resisting end to rotate the latching member to unlatch the latching end from the latching flange.

14. The electronic device of claim 13, wherein:
the pressing member comprises a guiding rod and a button;
the guiding rod is configured to pass through the guiding groove;
one end of the guiding rod is coupled to the button, and a second end of the guiding rod is configured to resist against the resisting end;
the button is mounted within the button hole;
the restoring member is sleeved over the guiding rod;
one end of the restoring member resists against an end wall of the guiding groove, and a second end of the restoring member resists against an inner surface of the frame.

15. The electronic device of claim 14, wherein:
the rear panel defines a clearance slot communicating with the receiving hole;
the camera mechanism is configured to slide along the clearance slot to extend out of the main body through the receiving hole.

* * * * *